United States Patent
Wilde et al.

[11] Patent Number: 6,075,673
[45] Date of Patent: Jun. 13, 2000

[54] COMPOSITE SLIDER DESIGN

[75] Inventors: Jeffrey P. Wilde, Los Gatos; Jerry E. Hurst, Jr., San Jose; John F. Heanue, Fremont; John H. Jerman, Palo Alto, all of Calif.

[73] Assignee: Read-Rite Corporation, Fremont, Calif.

[21] Appl. No.: 09/112,174

[22] Filed: Jul. 8, 1998

Related U.S. Application Data

[63] Continuation-in-part of application No. 08/851,379, May 5, 1997
[60] Provisional application No. 60/022,775, Jul. 30, 1996, and provisional application No. 60/023,426, Aug. 6, 1996.

[51] Int. Cl.[7] .............................. G11B 5/60; G11B 7/135; G11B 11/10
[52] U.S. Cl. ......................... 360/103; 369/13; 369/44.19
[58] Field of Search .................... 360/103, 114; 369/13, 44.17, 44.19, 44.22, 112, 44.12, 44.23, 244

[56] References Cited

U.S. PATENT DOCUMENTS

| | | | |
|---|---|---|---|
| 4,799,210 | 1/1989 | Wilson | 369/110 |
| 4,911,512 | 3/1990 | Yamamoto et al. | 350/96.11 |
| 4,987,505 | 1/1991 | Iwabuchi et al. | 360/103 |
| 5,199,090 | 3/1993 | Bell | 385/33 |
| 5,223,997 | 6/1993 | Uemura et al. | 360/103 |
| 5,497,359 | 3/1996 | Mamin et al. | 369/44.15 |
| 5,615,203 | 3/1997 | Fukakusa | 369/244 |
| 5,774,281 | 6/1998 | Maeda et al. | 359/822 |
| 5,999,303 | 12/1999 | Drake | 359/198 |

FOREIGN PATENT DOCUMENTS

| | | |
|---|---|---|
| 341829 | 11/1989 | European Pat. Off. |
| 549236 | 6/1993 | European Pat. Off. |
| 61-39251 | 2/1986 | Japan |
| 2-35677 | 2/1990 | Japan |
| 2-195531 | 8/1990 | Japan |
| 3-113714 | 5/1991 | Japan |
| 3-288338 | 12/1991 | Japan |
| 5-54422 | 3/1993 | Japan |
| 5-73980 | 3/1993 | Japan |
| WO 98/09279 | 5/1998 | WIPO |
| WO 98/09280 | 5/1998 | WIPO |
| WO 98/09284 | 5/1998 | WIPO |
| WO 98/09285 | 5/1998 | WIPO |
| WO 98/09286 | 5/1998 | WIPO |
| WO 98/09287 | 5/1998 | WIPO |
| WO 98/09288 | 5/1998 | WIPO |
| WO 98/09289 | 5/1998 | WIPO |
| WO 98/09392 | 5/1998 | WIPO |

*Primary Examiner*—David L. Ometz
*Attorney, Agent, or Firm*—Robert King; Samuel A. Kassatly

[57] ABSTRACT

A composite slider, for use in an optical or magneto-optical head that includes an optical assembly, comprises a mounting block that supports optical components, and a body that provides an air bearing surface and that further supports optical components. The slider body and mounting block include channel patterns that define an optical path. The slider mounting block includes an adhesive release channel disposed transversely relative to the optical path. The slider body includes a vertical channel and a lateral channel within which the optical components are disposed.

31 Claims, 6 Drawing Sheets

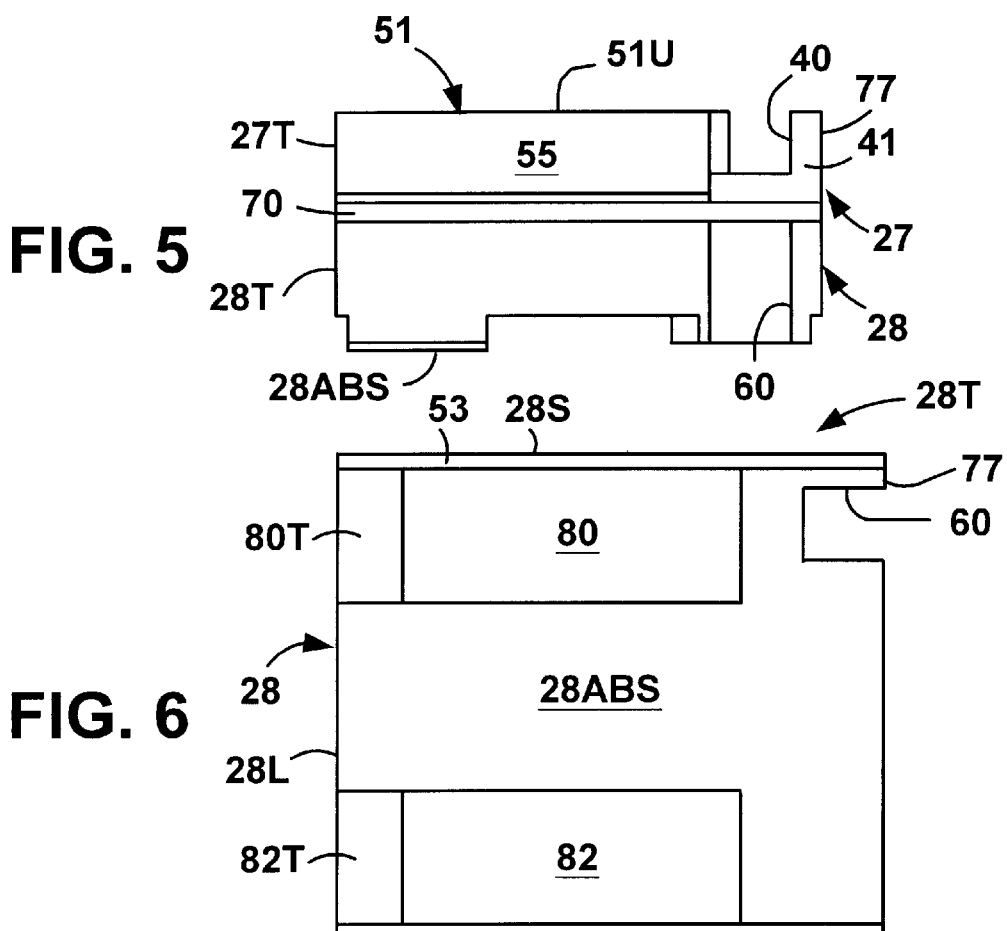
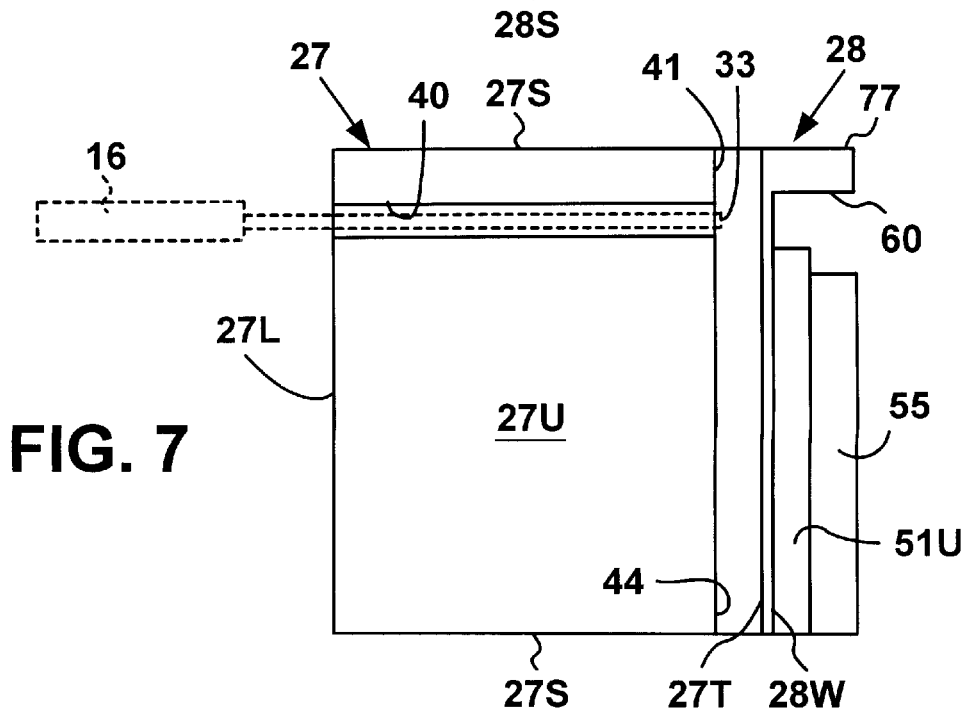

COMPOSITE SLIDER DESIGN

CROSS-REFERENCE TO RELATED APPLICATIONS

The present application is a continuation-in-part application of co-pending U.S. patent application Ser. No. 08/851,379, filed on May 5, 1997, which is incorporated herein by reference.

The present application relates to U.S. patent application Ser. No. 60/025,801 filed on Aug. 27, 1996, and to PCT patent application No. 98/09,287, filed on Aug. 27, 1997, both of which are incorporated herein by reference.

BACKGROUND OF THE INVENTION

1. Field of the Invention

The present invention relates to the field of data storage systems such as disk drives. The invention particularly relates to a slider design for use in an optical or magneto-optical read-write head for high density recording and reading of information onto and from a storage medium.

2. Description of the Related Art

Data storage systems such as those used with computer systems, typically store data magnetically or magneto-optically onto a storage medium. Data stored on the medium, whether magnetic or optical, is contained in spiral or concentric tracks. An data storage system described in U.S. Pat. No. 4,799,210 to Wilson, includes a laser diode assembly mounted on a fixed platform, and an optical head mounted on a movable stage. The laser beam is coupled to the movable head through a flexible optical fiber. Japanese patent application No. 59-117,180 describes another optical system mounted on the top or upper side of a slider.

Efforts to reduce the size and weight of optical heads are represented by optical integrated circuits or thin film structures. U.S. Pat. No. 4,911,512 to Yamamoto et al. describes a far-field type optical transducer, and a semi-conductor laser secured on a submount of silicon. A thin film silicon dioxide, $SiO_2$, waveguide element and a glass waveguide layer are also fixed on the submount. A collimator lens, a beam splitter, and a focusing grating are formed on the glass waveguide layer.

Another attempt to achieve compactness and weight reduction of a magneto-optical head is described in U.S. Pat. No. 5,199,090 to Bell. The Bell patent describes a magneto-optic head fabricated on a glass slider and flown adjacent a magneto-optical disk. A transducer is fabricated on an end of the glass slider. A planar or channel waveguide structure, fabricated by ion exchange in the end face of the glass slider, couples light from a light source, such as a laser diode, to the disk for reading or writing.

Optical heads present several slider design concerns. A first concern relates to the optical path of the optical assembly mounted on the slider. The optical path limits the ability to reduce the slider height, particularly if such a height forms part of the optical path. Another concern relates to the footprint (i.e., the projected surface area) of the slider, which should be sufficiently large to carry the optical assembly and the fibers mounted onto the slider, without affecting the aerodynamic flying performance of the optical head. Yet another consideration is the weight of the slider in light of the additional weight of the optical assembly and fibers.

Another design concern is the overall weight of the optical head. It is a desirable objective to reduce the slider weight in order to improve the data access time. However, the slider design in an optical or magneto-optical read-write head is more involved than the slider design of a magnetic head, since additional features are needed to accommodate the slider optical components such as a lens, a mirror, optical fibers, and a field generating magnetic coil in the case of a magneto-optical recording head. These additional components augment the fabrication complexity of the slider design, and further increase the access time.

SUMMARY OF THE INVENTION

The present invention provides a new composite slider for use in an optical or magneto-optical head that includes an optical assembly. The slider comprises a mounting block that supports optical components, and a body that provides an air bearing surface and that further supports optical components. The slider body and mounting block include channel patterns that define an optical path. The slider mounting block includes an adhesive release channel disposed transversely relative to the optical path. The slider body includes a vertical channel and a lateral channel within which the optical components are disposed.

BRIEF DESCRIPTION OF THE DRAWINGS

The features of the present invention and the manner of attaining them, will become apparent, and the invention will be understood by reference to the following description and the accompanying drawings, wherein:

FIG. 5 is a front elevational view of the assembled slider of FIGS. 1B, 1C and 1D;

FIG. 6 is a bottom plan view of the slider body of FIGS. 1B, 1C, 1D, 2 and 5;

FIG. 7 is a top plan view of the slider of FIGS. 1B, 1C, 1D, 2 and 5; and

Similar numerals refer to similar elements in the drawings. It should be understood that the sizes and dimensions of the various components in the figures might not be in exact proportion, and are shown for visual clarity and for the purpose of explanation.

DETAILED DESCRIPTION OF THE PREFERRED EMBODIMENTS

Figure 1A:
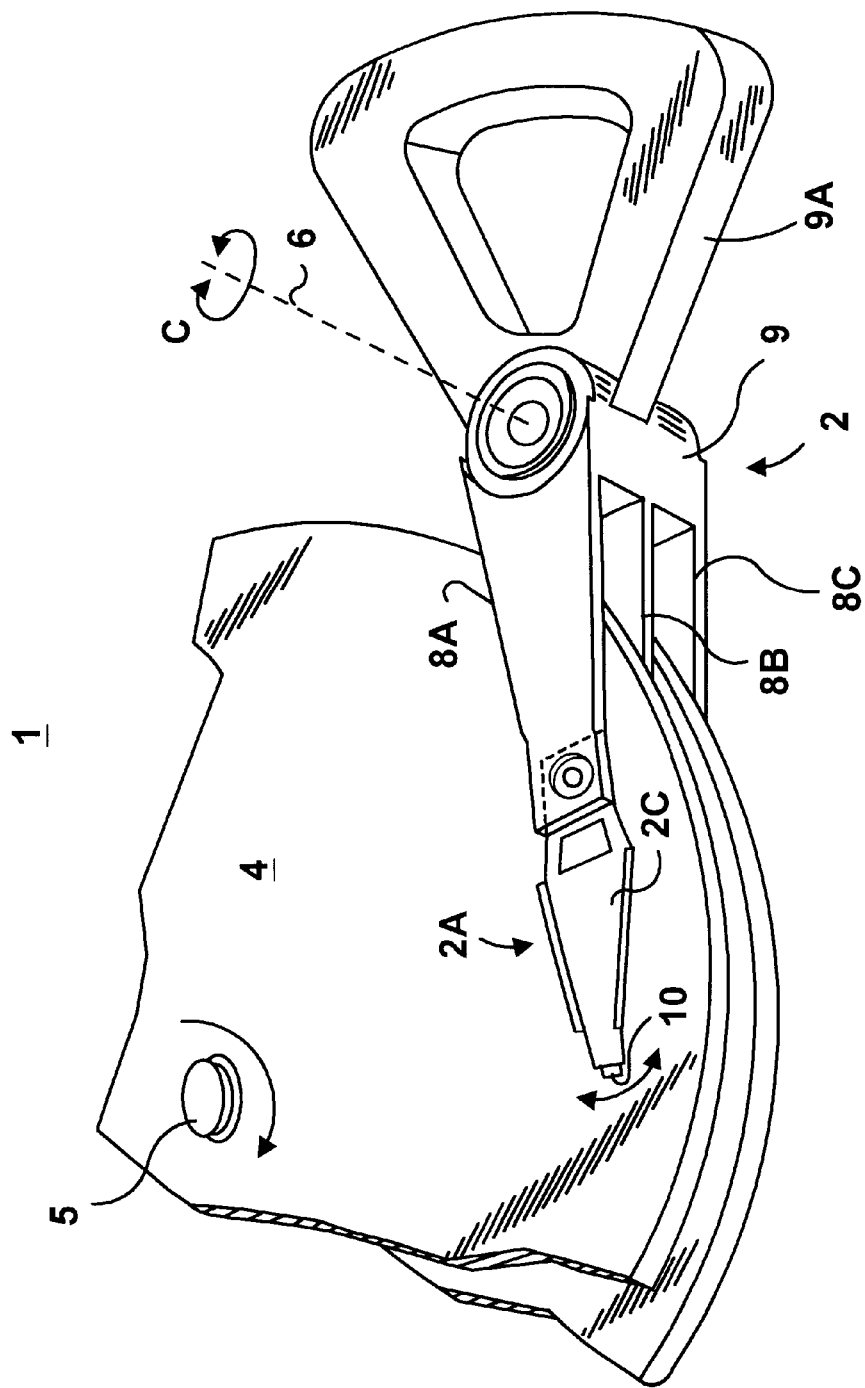
FIG. 1A is a fragmentary, perspective view of a head stack assembly using a head gimbal assembly that includes a head designed according to the present invention.

FIG. 1A illustrates a disk drive 1 comprised of a head stack assembly 2 and a stack of spaced apart optical or MO data storage disks or media 4 that are rotatable about a common shaft 5. The head stack assembly 2 is rotatable about an actuator axis 6 in the direction of the arrow C. The head stack assembly 2 includes a number of actuator arms, only three of which 8A, 8B, 8C are illustrated, which extend into spacings between the disks 4.

The head stack assembly 2 further includes an actuator block 9 and a magnetic rotor 9A attached to the block 9 in a position diametrically opposite to the actuator arms 8A, 8B, 8C. The rotor 9A cooperates with a stator (not shown) for rotating in an arc about the actuator axis 6. Energizing the coil of the rotor 9A with a direct current in one polarity or the reverse polarity causes the head stack assembly 2, including the actuator arms 8A, 8B, 8C, to rotate about the actuator axis 6 in a direction radial to the disks 4.

Figure 1B:
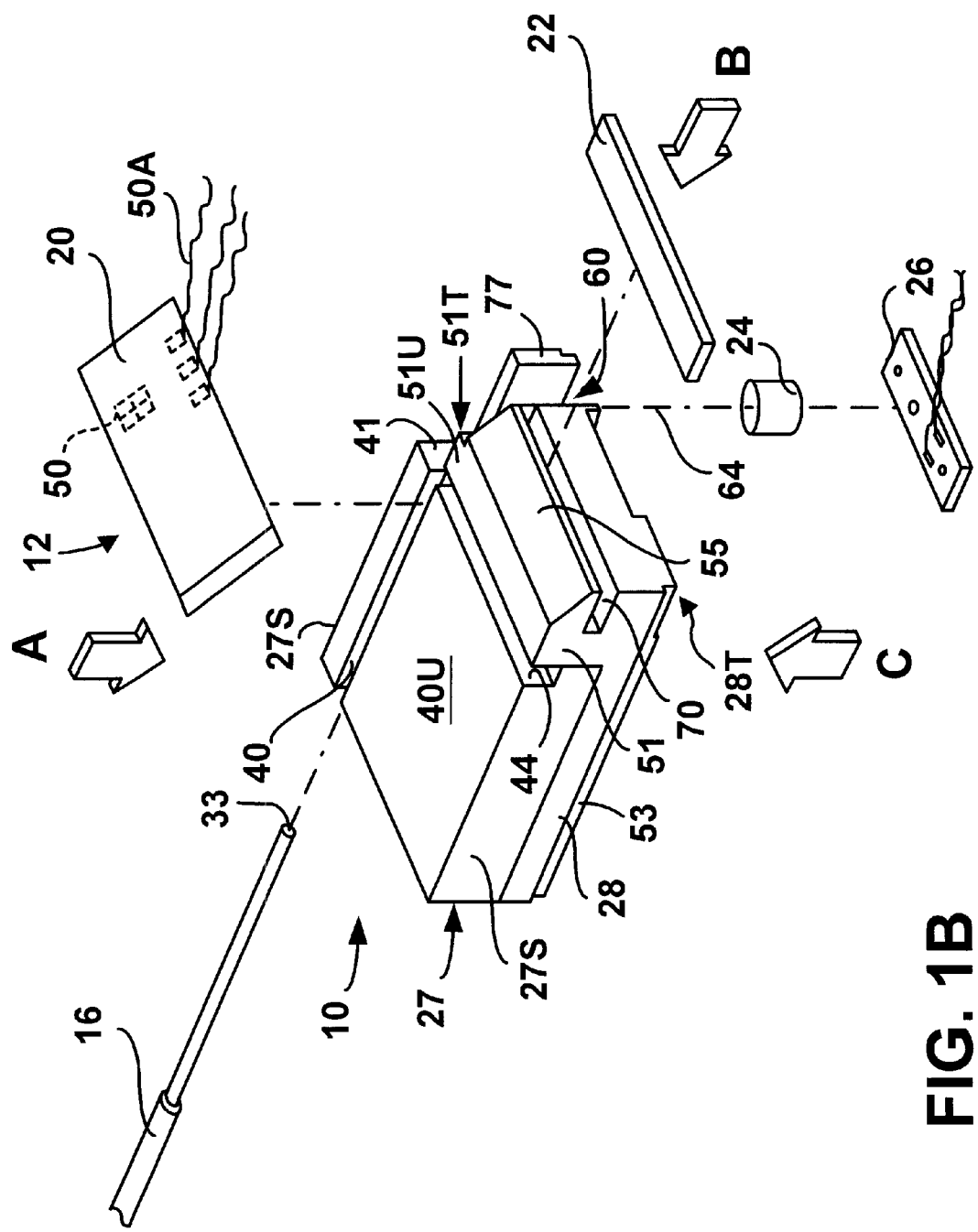
FIG. 1B is a perspective view of a slider design according to a first embodiment of the present invention, forming part of the head of FIG. 1A.
Figure 1C:
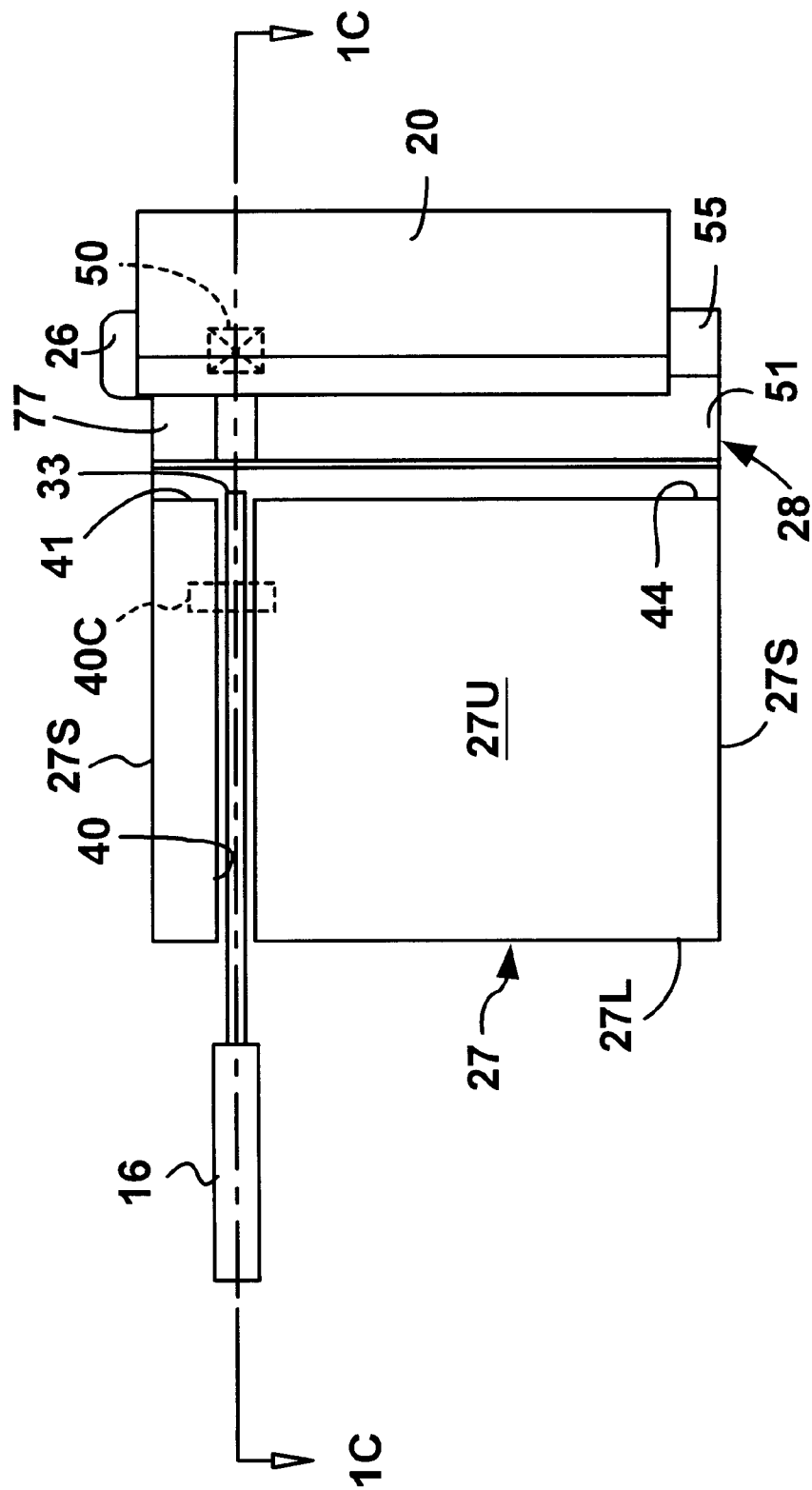
FIG. 1C is a top plan view of the slider of FIG. 1B shown assembled to an optical assembly.
Figures 1D, 8:
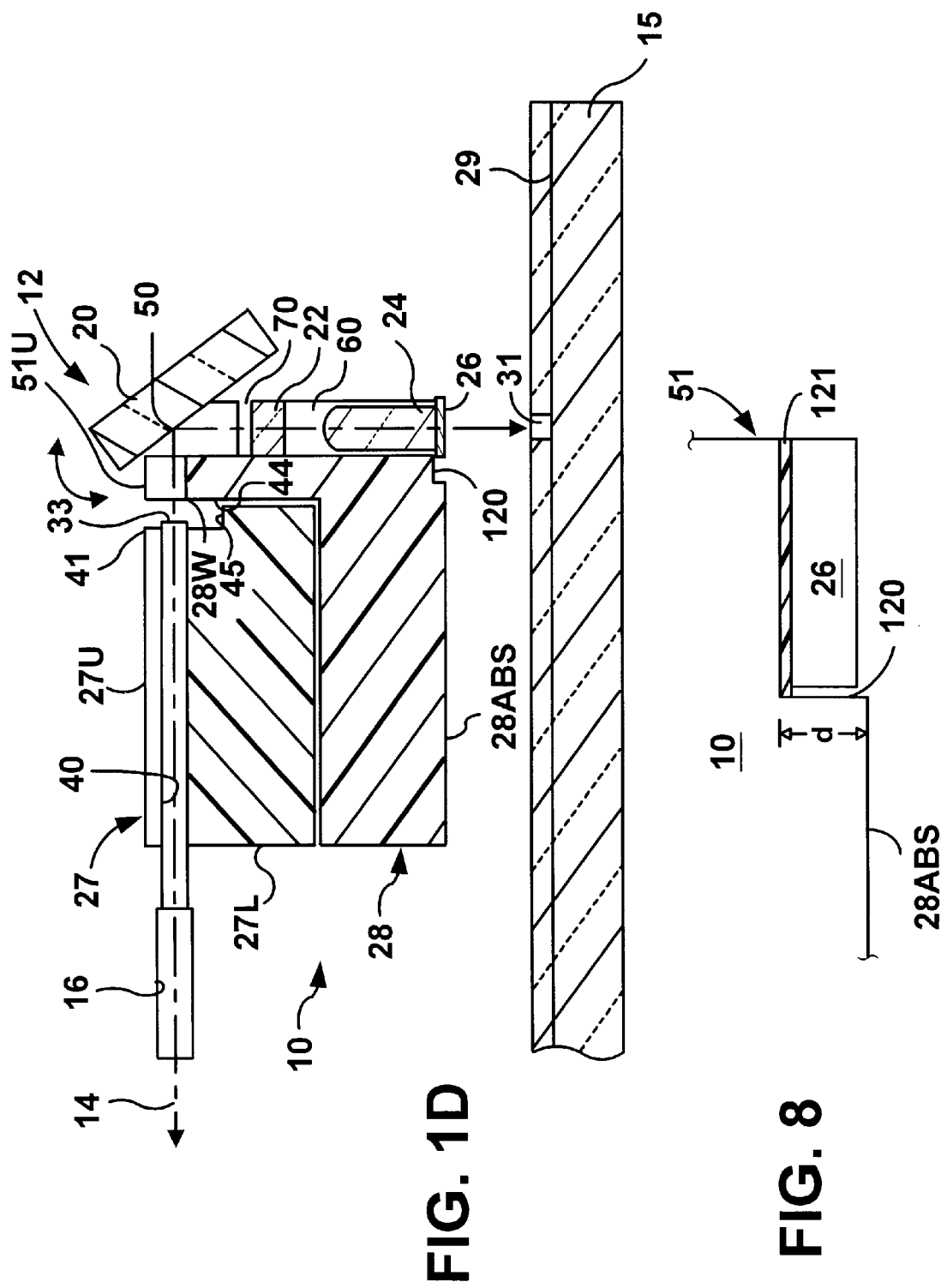
FIG. 1D is a cross-sectional, side elevational view of the slider and optical assembly of FIGS. 1B and 1C, taken along line 1C—1C in FIG. 1C.
FIG. 8 is an enlarged, fragmentary, side elevational view of a stepped groove formed in a preferred embodiment of the present invention for accommodating a coil assembly.
Figure 2:
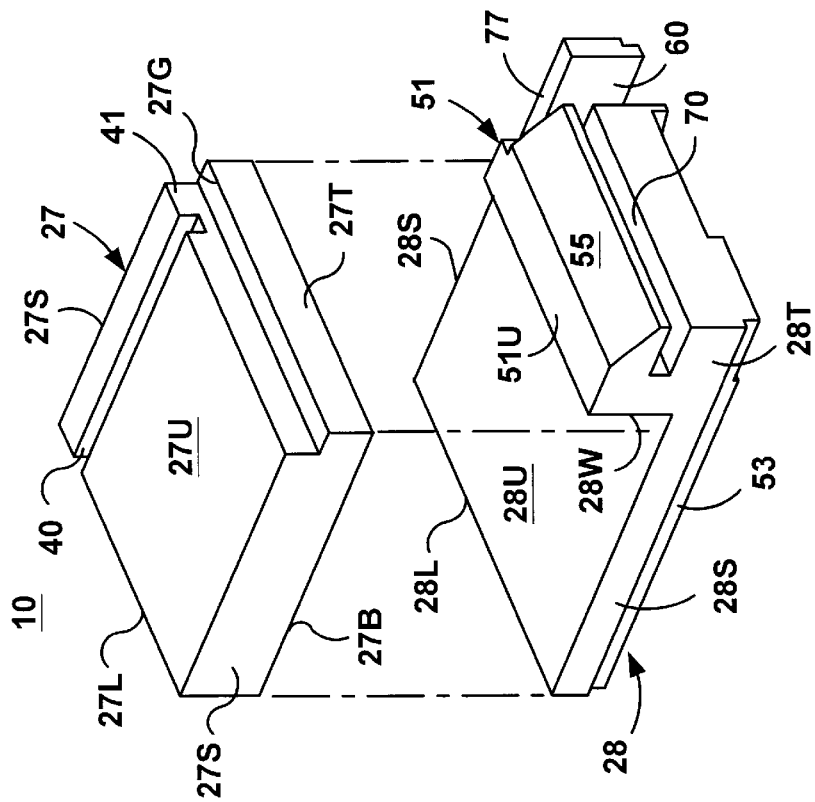
FIG. 2 is an exploded assembly view of the slider of FIG. 1A formed of a slider mounting block and a slider body.

A head gimbal assembly (HGA) 2A is secured to each of the actuator arms, for instance 8A. The HGA 2A comprises a resilient load beam 2C and a slider 10. The slider 10 is secured to the free end of the load beam 2C. The slider 10 is also referred to herein as a support element since, as illustrated in FIGS. 1B–1D, it supports an optical assembly 12 and/or an electromagnetic coil assembly 26. The optical assembly 12 is secured to the HGA 228 and in particular to the slider for providing the required optical reading and writing beams.

As it will be explained later in greater detail, the optical assembly 12 (FIG. 1B) is secured to the slider 10 for directing a read-write laser beam (or light beam) 14 (FIG. 1D) onto and from a data storage medium such as an optical or a magneto-optical disk 15. According to one embodiment of the present invention, the optical assembly 12 includes a linearly polarized diode laser source or chip (not shown) operating in a visible or near ultraviolet frequency region and emitting an optical power sufficient for reading and writing data onto and from the disk. In one embodiment, the laser source is selected to operate within a range of 635–685 nm; however, a laser source (or an optical beam) of other frequencies can alternatively be used.

With reference to FIGS. 1B–1D, the optical assembly 12 includes an optical fiber 16, a mirror (or reflective surface) 20, a quarter-wave plate 22, and a lens 24. The optical fiber 16 guides the laser beam along an optical path defined by the optical assembly 12. While only one optical fiber 16 is shown for the purpose of illustration, it should be clear that additional optical fibers or other light conveying means can alternatively be employed. The laser beam 14 emanating from the optical fiber 16 impinges upon the mirror 20 and is reflected thereby onto and through the quarterwave plate 22. The laser beam 14 continues its travel along the optical path through the lens 24 and a magnetic coil assembly 26 onto the disk 15.

During the data writing phase, the laser beam is routed by the optical assembly 12 to a magneto-optical recording layer 29 (FIG. 1D) within the disk 15. The laser beam 14 lowers the coercivity of the magneto-optical layer 29 by heating a target spot 31 to at least the Curie point of the magneto-optical layer 29. Preferably, the optical intensity of the laser beam 14 is held constant, while a time varying vertical bias magnetic field generated by a magnetic coil assembly 26 is used to define a pattern of "up" or "down" magnetic domains perpendicular to the disk 15. This technique is known as magnetic field modulation (MFM). As the selected spot 31 cools, information embodied in the laser beam 14 is encoded on the disk 15.

During the data readout phase, the laser beam 14 (at a lower intensity compared to the laser beam used in the data writing phase) is routed by the optical assembly 12 to the disk 15. At any given spot of interest 31, upon reflection of the laser beam 14 from the magneto-optical layer 29, the Kerr effect causes the reflected laser beam 14 to have a rotated polarization of either clockwise or counter clockwise sense that depends on the magnetic domain polarity at the target spot 31.

In the present embodiment, the optical path of the laser beam 14 is bi-directional. The reflected laser beam 14 is received through the optical assembly 12 and propagates along the optical fiber 16 to exit at one of its ends for subsequent conversion to an electrical signal. Additional operational details of the optical assembly can be found, for example, in U.S. patent applications Ser. No. 08/844,167; U.S. Ser. No. 09/019,225; U.S. Ser. No. 08/844,207; U.S. Ser. No. 08/883,320; U.S. Ser. No. 08/844,208; U.S. Ser. No. 08/745,095; U.S. Ser. No. 08/851,379; U.S. Ser. No. 08/798, 912; U.S. Ser. No. 08/823,422; and U.S. Ser. No. 08/771, 057, all of which are incorporated herein by reference.

The slider 10 is generally formed of two separate components that are securely attached or connected together to form a unitary or integral slider 10. The first component is a slider mounting block 27 that supports and retains the fiber 16. The second component is a slider body 28 that supports and retains the mirror 20, the quarter-wave 22, the lens 24, and the coil assembly 26, and that provides an appropriate air bearing surface to the head. The slider 10 is dimensioned to accommodate the physical size and weight of the optical assembly 12, as well as the working distances along the optical path, between a forward end 33 (FIG. 1D) of the optical fiber 16, the mirror 20, the lens 24 and the magneto-optical layer 29 of the disk 15.

The slider mounting block 27 will be described with reference to FIGS. 1C, 1D, 2, 5 and 7. The slider mounting block 27 is a solid block having generally flat, rectangular or square shaped top side 27U, bottom side 27B, trailing side 27T, leading side 27L, and two longitudinal sides 27S. The optical fiber 16 is secured to the slider 10 along a fiber channel 40 formed at least in part within the upper surface (or top) 27U of the slider mounting block 27. The fiber channel 40 extends along substantially the entire length of the slider mounting block 27, and is sufficiently wide to receive the optical fiber 16, which is placed in a recessed position (FIG. 1D) within the fiber channel 40. The fiber channel 40 is filled with an ultraviolet curing epoxy or similar adhesive material to secure the optical fiber 16 to the slider 10. While the fiber channel 40 is shown as being uniform along its length, it should be clear that one or more cavities 40C (shown in dashed lines in FIG. 1D) can be formed along the fiber channel 40 to accommodate optical components such as a lens. Although in a preferred embodiment the fiber channel 40 is located in proximity to a longitudinal side 27S of the slider mounting block 27, a person of ordinary skill in the art will recognize that the fiber channel 40 can be located at other positions on the slider 10, for example along a central axis of the slider mounting block 27.

The two sides 27S and the leading side 27L of the slider mounting block 27 are preferably flat and flush with corresponding adjacent sides 28S and the leading side 28L, respectively, of the slider body 28. A groove or a step 27G is formed in the trailing side 27T so that a transverse channel 44 (also referred to as an adhesive release channel) is formed when the slider mounting block 27 and the slider body 28 are assembled. The transverse channel 44 extends substantially perpendicularly (or at an appropriate angle) to the fiber channel 40, across substantially the entire width of the slider 10. The transverse channel 44 acts as a stop for the adhesive material within the fiber channel 40, to prevent the adhesive material from flowing to the mirror 20 and affecting the integrity of the optical path. Thus, excess adhesive material is allowed to flow into the transverse channel 44. Although, in a preferred embodiment the transverse channel 44 is located in proximity to a trailing edge or side 51T (FIG. 1B) of the slider 10, a person of ordinary skill in the art will recognize that the transverse channel 44 may be located at other positions on the slider 10. In another embodiment, the groove 27G may be eliminated altogether.

The optical fiber 16 has a forward end 33 that projects in part within the transverse channel 44, beyond an edge 41 (FIG. 1D) of the trailing side 27T, and is raised above the bottom 45 of the transverse channel 44. Accordingly, excess adhesive material flows along the bottom 45, at a distance from the forward end 33, in order to prevent the excess adhesive material from obstructing the path of travel of the laser beam 14. The forward end 33 is directed toward the mirror 20, and is positioned at a suitable, optically defined distance therefrom. The laser beam 14 emanating from the fiber 16 traverses the transverse channel 44 and impinges upon a reflective target field 50 on the mirror 20, along an unobstructed path.

Figure 3:
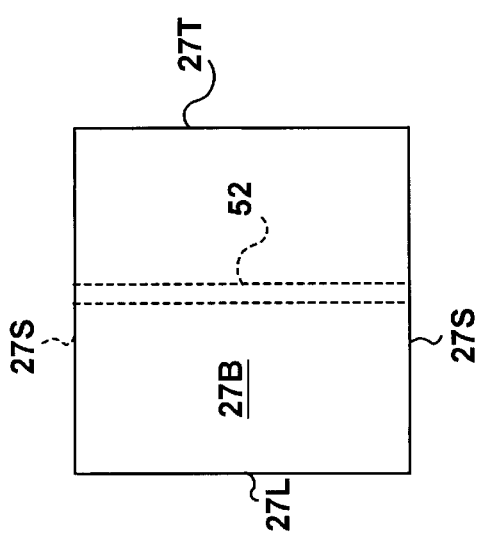
FIG. 3 is a bottom plan view of the slider mounting block of FIG. 2.
Figure 4:
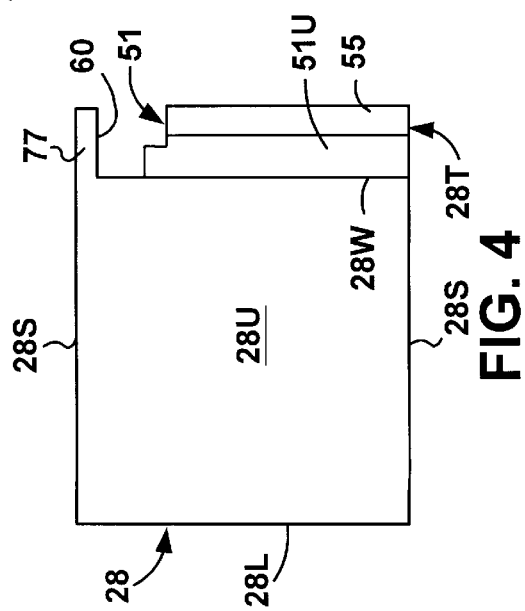
FIG. 4 is a top plan view of the slider body of FIG. 2.

FIG. 3 shows the bottom side 27B of the slider mounting block 27. In one embodiment, the bottom side 27B is generally flat and is secured to a matching slider body upper surface 28U (FIGS. 2 and 4), such that the trailing side 27T abuts against an upright wall 28W of the slider body 28 (shown exaggerated in FIG. 7), to form the transverse channel 44. In another embodiment, the bottom side 27B includes an adhesive channel 52 (shown in dashed lines in FIG. 3) in which adhesive is deposited, or alternatively, excess adhesive is allowed to flow when the slider mounting block 27 and the slider body 28 are secured together. It should be understood that a pattern of adhesive channels 52 can be formed in the bottom side 27B and/or the upper surface 28U.

Considering now the slider body 28 in greater detail in connection with FIGS. 1B, 1C, 1D, 2, 4, 5, 6, and 7, it generally includes a leading side 28L, a trailing side 28T, two longitudinal sides 28S, the upper surface 28U, and an air bearing surface 28ABS. The leading side 28L is generally flat, and is flush with the leading side 27L when the slider mounting block 27 and the slider body 28 are secured together. The trailing side 28T includes a raised section 51 defined by the upright wall 28W, a flat upper surface 51U (FIGS. 2 and 4) that extends in a flat slanted or angled surface 55 (FIG. 2) upon which the mirror 20 is mounted. The mirror 20 deflects the laser beam 14 from the optical fiber 16 toward the lens 24. In a preferred embodiment, the slanted surface 55 is at an angle of approximately 45 degrees, so that the light beam 14 is reflected at a right angle by the mirror 20 (FIG. 1C). When the slider 10 is assembled, the flat upper surface 51U of the raised section 51 is generally, though not necessarily, flush with the upper surface 27U of the mounting block 27.

The raised section 51 also includes a vertical channel 60, which is generally aligned with, and is in optical communication with the fiber channel 40. The vertical channel 60 retains the lens 24, and defines a part of the optical path along which the laser beam 14 travels. The width of the vertical channel 60 is sufficient to allow for the inter-track steering, movement, scanning, or deflection of the laser beam 14. The center line 64 (FIG. 1B) of the optical path along the vertical channel 60 is preferably co-aligned with the focal axis of the lens 24.

The raised section 51 further includes a lateral channel 70 (FIGS. 1B, 2), disposed at approximately the center of the raised section 51, for receiving the quarter-wave plate 22. The lateral channel 70 lies in a plane that is generally normal (or at another appropriate angle) to the planes of the fiber channel 40, and the vertical channel 60. The lens 24 is secured within the vertical channel 60, along the optical path, underneath the quarter-wave plate 22, in order to focus the laser beam 14 on the disk 15, as a focused optical spot 31 (FIG. 1D). According to another embodiment, the lens 24 is positioned, at least in part within the lateral channel 70 along the optical path of the laser beam 14. The bottom of the lens 24 is slightly recessed relative to the air bearing surface 28ABS.

The air bearing surface 28ABS of the slider 10 includes twin rails 80, 82 (FIG. 6) that do not extend necessarily along the entire length of the slider 10. Each of the rails 80, 82 terminates in a corresponding taper 80T and 82T. The width of the rails 80, 82 allows the slider 10 to provide the required air bearing surface.

The slider body 28 also includes a lateral wall 77 that forms an integral part of the trailing side 28T. The lateral wall 77 and the raised section 51 define the vertical channel 60.

With reference to FIGS. 1D and 8, the raised section 51 includes a stepped groove 120 formed in the underside of the slider 10, at, or in proximity to the trailing side 28T of the slider body 28. The coil assembly 26 is disposed within the groove 120, where it is secured to the underside of the slider 10 by means of an adhesive or adhesive layer 121. The groove 120 simplifies the precise positioning and alignment of the lens 24 and the coil assembly 26 relative to the air bearing surface 28ABS.

After the slider 10 and the optical assembly 12 are assembled, the upper surface 27U of the mounting block 27 and/or the flat upper surface 51U of the raised section 51 are secured to the load beam, i.e., 2A (FIG. 1A). Two peripheral grooves 53 can be formed along the two opposite sides 27S.

In one embodiment, the lens 24 is a GRIN rod lens, though other lens can be used. The mirror 20 can be a steerable micro-machined mirror assembly. Fine tracking and short seeks to a series of nearby tracks may be performed by rotating the reflective target field 50 about a rotation axis so that the propagation angle of the laser beam is changed before transmission to the quarter-wave plate 22. The reflective target field 50 is rotated by applying a differential voltage to a set of drive electrodes. The differential voltage on the electrodes creates an electrostatic force that rotates the reflective target field 50 about a set of axial hinges (not shown), and enables the focused optical spot 31 to be moved in the radial direction of the disk. Wires 50A are connected to the mirror 20 for providing dithering and other control signals. The mirror 20 can include, or can be replaced by a reflective piezzo-electric element that allows the laser beam 14 to be deflected, scanned, or otherwise steered for fine tracking.

The magnetic coil assembly 26 may be of the type described in patent application titled "Coil for Use With Magneto-Optical Head", by Terry McDaniel and Yugang Wang, Ser. No. 08/844,167, filed on Apr. 18,1997; or patent application titled "Thin-Film Electro-Magnetic Coil Design for Use in a Flying Magneto-Optical Head", by Peter Bischoff and Yugang Wang, Ser. No. 09/019,225, filed on Feb. 4, 1998, both of which are incorporated herein by reference.

The slider mounting block 27 and the slider body 28 can be obtained by slicing a wafer into a plurality of individual die, with the various channels 40, 60 and 70 formed therein.

The slider mounting block 27 and the slider body 28 can be made of hard material such as titanium carbide. Alternatively, the slider mounting block 27 and the slider body 28 can be prefabricated or molded from calcium titanate or another suitable material, either individually, or sliced from a row bar of sliders. In other embodiments, the slider mounting block 27 and the slider body 28 can be formed of suitable material such as silicon, by various available techniques such as hot isostatic press process (HIP), reactive etching, ion beam etching, or other etching or machining processes.

It should be understood that the channel configurations shown and described herein are shown only for illustration purpose, and that other channel configurations are possible.

It should also be understood that the geometry, compositions, and dimensions of the elements described herein may be modified within the scope of the invention and are not intended to be the exclusive; rather, they can be modified within the scope of the invention. Other modifications can be made when implementing the invention for a particular environment.

What is claimed is:

1. A slider for mounting optical components that direct an optical beam onto and from the optical components, the slider comprising:
   a slider mounting block for supporting at least one of the optical components;
   a slider body secured to said slider mounting block, and providing an air bearing surface;
   wherein said slider body includes a trailing side comprised of a raised section that defines an upright wall and an upper surface that extends in a slanted surface; and
   wherein said raised section supports at least one of the optical components.

2. A slider according to claim 1, wherein said slider body supports said at least one of the optical components.

3. A slider according to claim 1, wherein said slider mounting block includes, a bottom side, a trailing side, a leading side, and two longitudinal sides; and
   wherein said slider body includes an underside side, a trailing side, a leading side, and two longitudinal sides.

4. A slider according to claim 3, wherein said slider mounting block longitudinal sides are generally coplanar with said slider body longitudinal sides; and
   wherein said slider mounting block leading side is generally coplanar with said slider body leading side.

5. A slider according to claim 3, wherein said slider mounting block includes a step that defines a transverse channel with said slider body when said slider mounting block and said slider body are assembled.

6. A slider according to claim 3, wherein said slider body includes an upright wall;
   wherein said slider mounting block bottom side is generally flat and is secured to a matching slider body upper surface; and
   wherein said slider mounting block trailing side abuts against said upright wall.

7. A slider according to claim 6, wherein said slider body upper surface includes a channel pattern.

8. A slider according to claim 6, wherein said slider mounting block includes a bottom surface that includes a channel pattern.

9. A slider according to claim 3, wherein said slider body trailing side includes a stepped groove for accommodating a coil assembly.

10. A slider according to claim 3, wherein said slider body underside includes two peripheral grooves.

11. A slider according to claim 1, wherein said slider mounting block includes a channel pattern that defines a path for the optical beam.

12. A slider according to claim 11, wherein said slider body includes a channel pattern that defines a path for the optical beam.

13. A slider according to claim 1, wherein said slider body includes a channel pattern that defines a path for the optical beam.

14. A slider according to claim 1, wherein said slider mounting block includes an adhesive release channel.

15. A slider according to claim 14, wherein said slider mounting block defines a path for the optical beam; and
   wherein said adhesive release channel is disposed at an angle relative to said optical path.

16. A slider according to claim 15, wherein said adhesive release channel is disposed substantially normally to said optical path.

17. A slider according to claim 1, wherein said slanted surface supports at least one of the optical components.

18. A slider according to claim 1, wherein said mounting block includes an upper surface;
   wherein said trailing side includes an upper surface; and
   wherein when said slider body and said slider mounting block are assembled, said trailing side upper surface is substantially coplanar with said mounting block upper surface.

19. A slider according to claim 1, wherein said slanted surface is disposed at an angle of approximately 45 degrees relative to said trailing side upper surface.

20. A slider for mounting optical components that direct an optical beam onto and from the optical components, the slider comprising:
   a slider mounting block for supporting at least one of the optical components;
   a slider body secured to said slider mounting block, and providing an air bearing surface;
   wherein said slider body includes a trailing side comprised of a raised section that defines an upright wall and an upper surface that extends in a slanted surface; and
   wherein said raised section includes a channel pattern that defines an optical path for the optical beam.

21. A slider for mounting optical components that direct an optical beam onto and from the optical components, the slider comprising:
   a slider mounting block for supporting at least one of the optical components;
   a slider body secured to said slider mounting block, and providing an air bearing surface;
   wherein said slider body includes a trailing side comprised of a raised section that defines an upright wall and an upper surface that extends in a slanted surface; and
   wherein said raised section includes a channel that retains at least one of the optical components.

22. A slider for use in an optical or magneto-optical head that includes optical components mounted on the slider for directing an optical beam onto and from the optical components, the slider comprising:
   a slider mounting block for supporting at least one of the optical components;
   a slider body secured to said slider mounting block, and providing an air bearing surface;

wherein said slider body includes a trailing side comprised of a raised section that defines an upright wall and an upper surface that extends in a slanted surface; and wherein said raised section supports at least one of the optical components.

23. A slider according to claim 22, wherein said slider mounting block includes a channel pattern that defines a path for the optical beam.

24. A slider according to claim 22, wherein said slider body includes a channel pattern that defines a path for the optical beam.

25. A slider according to claim 22, wherein said slider mounting block includes an adhesive release channel.

26. A slider according to claim 25, wherein said slider mounting block defines a path for the optical beam; and wherein said adhesive release channel is disposed at an angle relative to said optical path.

27. A slider according to claim 26, wherein said adhesive release channel is disposed substantially normally to said optical path.

28. A slider according to claim 22, wherein said slider mounting block includes a leading side and two longitudinal sides;

wherein said slider body includes a leading side and two longitudinal sides;

wherein said slider mounting block longitudinal sides are generally coplanar with said slider body longitudinal sides; and wherein said slider mounting block leading side is generally coplanar with said slider body leading side.

29. A slider according to claim 22, wherein said slider mounting block includes a step that defines a transverse channel with said slider body when said slider mounting block and said slider body are assembled.

30. A slider according to claim 22, wherein said slider mounting block is secured to the slider body; and wherein said slider mounting block abuts against said upright wall.

31. A slider according to claim 22, wherein said slider body includes a channel pattern; and wherein said slider mounting block includes a channel pattern.

* * * * *